(12) United States Patent  (10) Patent No.: US 9,150,100 B2
Kim et al.  (45) Date of Patent: Oct. 6, 2015

(54) FUEL MIXING PREVENTION DEVICE

(71) Applicant: Hyundai Motor Company, Seoul (KR)

(72) Inventors: Jang Ho Kim, Hwaseong-si (KR); Nam Ki Lee, Gunpo-si (KR); Bo Sung Lee, Daejeon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/102,359

(22) Filed: Dec. 10, 2013

(65) Prior Publication Data

US 2014/0353312 A1  Dec. 4, 2014

(30) Foreign Application Priority Data

May 28, 2013  (KR) .......................... 10-2013-0060085

(51) Int. Cl.
  *B65B 3/00* (2006.01)
  *B65D 47/02* (2006.01)
  *B60K 15/04* (2006.01)

(52) U.S. Cl.
  CPC ......... *B60K 15/0409* (2013.01); *B60K 15/0406* (2013.01)

(58) Field of Classification Search
  CPC ........... B60K 2015/0483; B60K 15/04; B60K 15/0406; B60K 2015/0461; B60K 2015/0429; B67D 7/04; F01N 2610/1413

USPC .................... 220/86.2, 86.3; 296/97.22, 96.4; 180/69.4; 280/830
  See application file for complete search history.

(56) References Cited

U.S. PATENT DOCUMENTS

| 8,807,369 | B2* | 8/2014 | Sasaki ......................... 220/86.2 |
| 8,899,285 | B2* | 12/2014 | Hagano ......................... 141/350 |
| 2009/0095373 | A1* | 4/2009 | Correira et al. ............... 141/350 |
| 2010/0006178 | A1* | 1/2010 | Muth et al. ..................... 141/350 |
| 2010/0218849 | A1* | 9/2010 | Hagano ......................... 141/350 |
| 2011/0132906 | A1* | 6/2011 | Miller et al. ................. 220/86.2 |
| 2012/0312420 | A1* | 12/2012 | Kataoka et al. ............... 141/350 |

FOREIGN PATENT DOCUMENTS

KR  10-20070083357 A  8/2007
KR  10-2012-0103198 A  9/2012

* cited by examiner

*Primary Examiner* — Shawn M Braden
(74) *Attorney, Agent, or Firm* — Morgan, Lewis & Bockius LLP

(57) ABSTRACT

A device prevents fuel mixing, for example, a different kind of fuel from being pumped into a gasoline vehicle or a diesel vehicle by mistake. The device can prevent unsuitable fuel from being pumped into a vehicle and can preclude a loss of fuel or a fire due to poor operation of a gas pump by a person who fuels the vehicle, by implementing a new type of mechanism for preventing fuel mixing which includes a lock that is disposed at the fuel-tank door of a vehicle and turned on/off in accordance with the inner diameter of a nozzle and a cap that can close the nozzle when a nozzle for an unsuitable kind of fuel is inserted.

5 Claims, 5 Drawing Sheets

FUEL MIXING PREVENTION DEVICE

CROSS-REFERENCE TO RELATED APPLICATION

The present application claims priority of Korean Patent Application Number 10-2013-0060085 filed May 28, 2013, the entire contents of which application is incorporated herein for all purposes by this reference.

BACKGROUND OF INVENTION

1. Field of Invention

The present disclosure relates to a device for preventing fuel mixing in a vehicle, and more particularly to a device for preventing fuel mixing which can prevent gasoline vehicles or diesel vehicles from being filled with other kinds of fuel by mistake.

2. Description of Related Art

In general, when fueling a diesel vehicle at a gas station, an accident of pumping gasoline into it by mistake is frequently generated.

Accordingly, pumping different kinds of fuel into vehicles is prevented at gas stations by differentiating the diameters of a diesel nozzle and a gasoline nozzle.

For example, the diameter of a diesel nozzle is about 31 mm and the diameter of a gasoline nozzle is about 20~21 mm.

The diameter of the fuel inlet of gasoline vehicles is usually about 20~21 mm, the same as the diameter of the gasoline nozzle, and the diameter of the fuel inlet of diesel vehicles is usually about 45~50 mm.

Therefore, the diesel nozzle cannot be put into the fuel inlet of the gasoline vehicles, but only the gasoline nozzle can be, so there is no problem of fuel mixing; however, since the gasoline nozzle, in addition to the diesel nozzle, can also be put into the fuel inlet of the diesel vehicles, fuels are frequently mixed.

Recently, self service gas stations for drivers to fuel by themselves are very popular with the increase in oil price and have several gas pumps to allow the drivers to fuel their vehicles in person, thereby consulting the drivers' convenience.

However, one gas pump has a nozzle for gasoline and a nozzle for diesel at the left and right sides, with a switch for selecting the kind of fuel at each side, such that when a driver selects a wrong nozzle or switch by mistake, fuels cannot help mixing, thereby frequently causing the problem of fuel mixing.

The accident of fuel mixing actually occurs frequently when fueling a diesel vehicle and the fuel mixing decreases the power of the engine and damages the engine itself, and it may also cause a big accident by stopping the engine while the vehicle is in motion. Further, the fuel mixing may damage the fuel system such as an injection pump.

In consideration of those problems, a variety of devices for preventing different kinds of fuel from mixing have been proposed in Korean Patent Publication No. 10-2006-0037948, Korean Patent Publication No. 10-2012-0103198, and Korean Utility Model Registration No. 20-0379665.

For example, "Capless fuel tanking system" has been disclosed in EP 1854653 A1.

The system has a structure that is composed of a latch and a flap door and can prevent fuel mixing by keeping the flap door closed when a nozzle for a different kind of fuel unsuitable for a vehicle is inserted, but opening the flap door when a nozzle for the kind of fuel suitable for the vehicle is inserted.

That is, since the diameter of the fuel inlet of a diesel vehicle is smaller than the gasoline nozzle, the latch does not move and the flap door is fixed and not opened in the structure.

The system, however, has a defect that when a person who fuels a vehicle inserts a nozzle for a different kind of fuel unsuitable for the vehicle and then starts pumping the fuel, the fuel overflows and it may cause a fire, with a loss of fuel.

Further, when a nozzle is inserted at an angle in a fuel inlet, the latch is operated and the door can open, so there is still the problem of fuel mixing.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a device for preventing fuel mixing which can basically prevent unsuitable fuel from being pumped into a vehicle and can preclude a loss of fuel or a fire due to poor operation of a gas pump by a person who fuels the vehicle, by implementing a new type of mechanism for preventing fuel mixing which includes a locking mechanism that is disposed at the fuel inlet door of a vehicle and locked/unlocked in accordance with the inner diameter of a nozzle and a cap that can close the nozzle when a nozzle for an unsuitable kind of fuel is inserted.

The device for preventing fuel mixing in a vehicle may include: a fuel inlet for injecting fuel; a fuel inlet door that is pivotable by a door hinge in the door inlet, as a member opening/closing the fuel inlet; and a locking mechanism that is slidably disposed on the top of the fuel inlet door and opens/closes the fuel inlet door while moving inward/outward by contact with a nozzle to be locked/unlocked into/out of locking grooves formed around the inner side of the fuel inlet.

Accordingly, the device for preventing fuel mixing may actively preclude a loss of fuel or a fire due to an accident of fuel mixing, by keeping the fuel inlet door closed, when a nozzle for fuel unsuitable for a vehicle is inserted, for example, when a nozzle for gasoline is inserted into a diesel vehicle.

The locking mechanism may include a plurality of sliders arranged in a concentric circle around the fuel inlet door, and each of the sliders is brought in contact with the nozzle through an inclined surface around the outer side and is locked/unlocked into/out of the locking grooves through the edge of a flange at the lower end.

Further, each of the sliders of the locking mechanism may be fitted in a guide hole on the top of the fuel inlet door, using a guide protrusion on its bottom, to be guided, and the sliders keep elastically pushed outward by springs in the guide holes.

All of the sliders of the locking mechanism may be slidable or at least one of the sliders may be slidable.

It may be possible to operate the sliders of the locking mechanism in contact with a diesel nozzle or a gasoline nozzle by making the diameter made by the upper ends of the sliders different, such that the present invention can be more widely used such as for diesel vehicles or gasoline vehicles.

A cap that prevents fuel from overflowing may be disposed on the top of the fuel inlet door.

Various aspects of the device for preventing fuel mixing in a vehicle provided by the present invention are configured to provide the following advantages.

First, since the fuel inlet door keeps closed by the locking mechanism that is turned on/off in accordance with the inner diameter of a nozzle, when a nozzle for fuel unsuitable for a vehicle is inserted, it is possible to actively preclude accidents (a fire and a loss of fuel etc.) which may be generated, when a person who fuels makes a mistake with fueling or an unskilled person operates a nozzle.

Second, since the locking mechanism that is locked/unlocked while sliding in contact with a nozzle is provided, it is possible to achieve a device for preventing fuel mixing with simple structure and operation method.

Third, the present invention can be more widely used, for example, for the fuel inlet of gasoline vehicles, in addition to the fuel inlet of diesel vehicle, through simple structural improvement such as the size of the locking mechanism.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
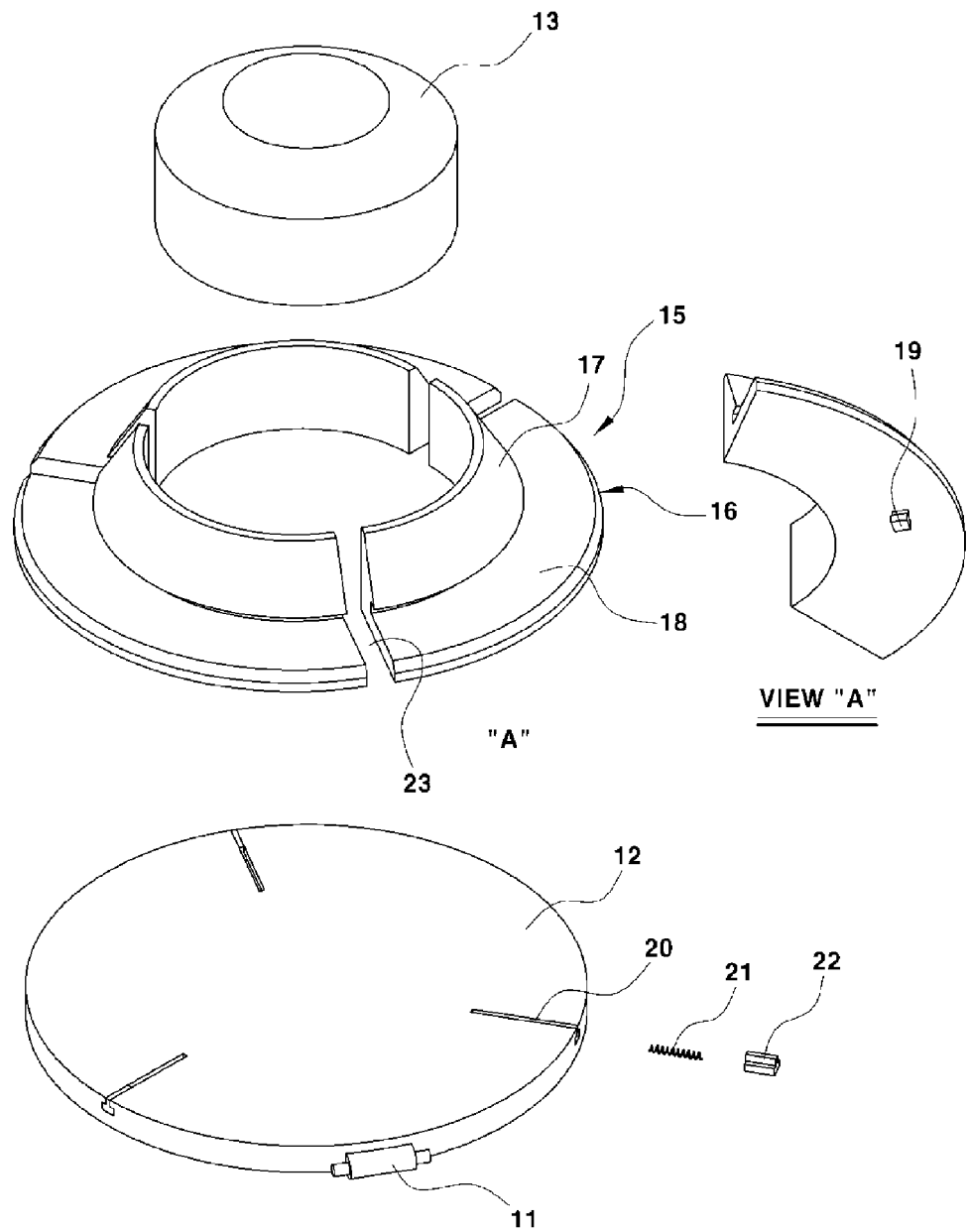
FIG. 1 is an exploded perspective view showing an exemplary device for preventing fuel mixing according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
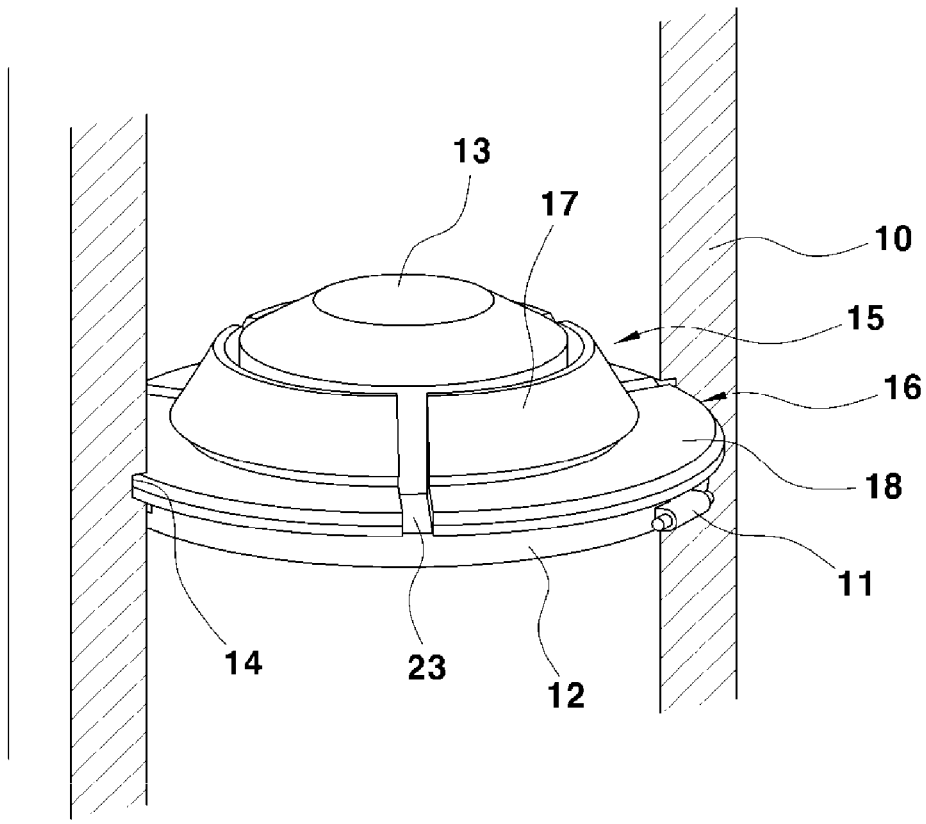
FIG. 2 is a perspective cross-sectional view showing an exemplary device for preventing fuel mixing according to the present invention.
Figure 2:
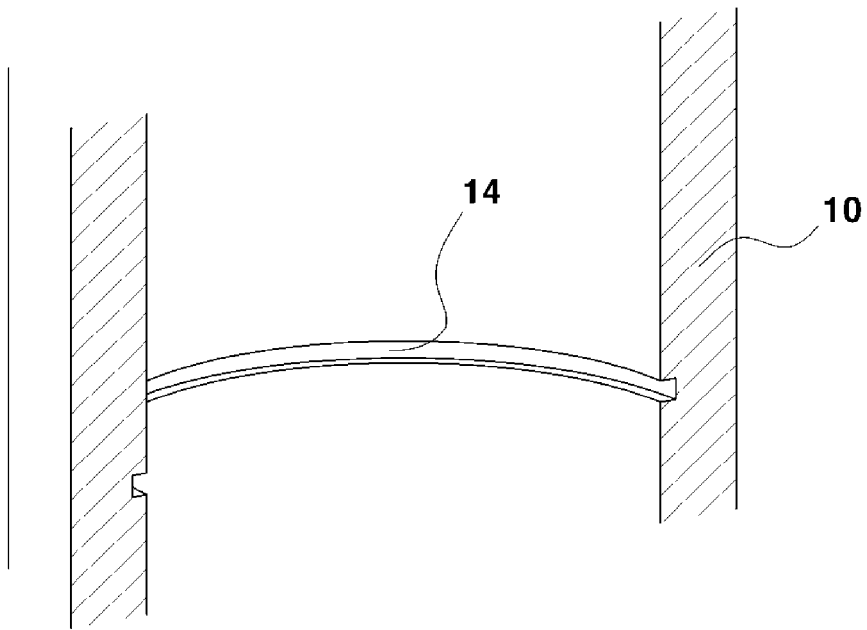

FIG. 1 is an exploded perspective view showing a device for preventing fuel mixing according to various embodiments of the present invention and FIG. 2 is a perspective cross-sectional view showing the device for preventing fuel mixing according to various embodiments of the present invention.

As shown in FIGS. 1 and 2, the device for preventing fuel mixing can selectively open/close a fuel inlet door, using a locking mechanism that is turned on/off in accordance with a nozzle to be inserted into a fuel inlet, in which the fuel inlet door does not open, when an unsuitable kind of fuel nozzle is inserted.

To this end, a pipe-shaped fuel inlet 10 for injecting fuel is provided and a fuel inlet door 12 that is pivotably supported by a door hinge 11 at a side of the edge and opens/closes the fuel inlet door 10 is disposed in the fuel inlet 10.

The structure that allows the fuel inlet door 12 to pivot in the fuel inlet 10, using the door hinge 11 and returns the fuel inlet door 12 to close the door inlet when a nozzle is removed is a common structure, and thus the detailed description is not provided herein.

A cap 13 is disposed at the center of the top of the door inlet door 12, for example, at the center of the top of the fuel inlet door 12 having a disc shape and it may be bonded, bolted, or integrally formed with the door. One will appreciate that such integral components may be monolithically formed.

A series of locking grooves 14 are formed horizontally around the inner side of the fuel inlet 10 and sliders 16 of the locking mechanism 15 to be described below are locked in the grooves.

A plurality of guide holes 20 is formed in the fuel inlet door 12, at a predetermined depth to the center from the edge, has a T-shaped cross-section with the top open, and is arranged circumferentially in the number corresponding to the number of the sliders 16, which are described below, and they can be finished by end caps 22 fitted in the outer end portions of the holes, with springs 21 and guide protrusions 19 of the sliders 16, which are described below, inserted in the locking grooves 14.

In particular, the locking mechanism 15 that can be locked/unlocked in accordance with the inner diameter of a nozzle is provided herein as a mechanism that is turned on (locked)/off (unlocked) for opening/closing the fuel inlet door 12.

The locking mechanism 15 is movably disposed on the top of the fuel inlet door 12 and locked/unlocked, that is, locked/unlocked into/out of the locking grooves 14 while moving inward/outward by contact with a nozzle that is inserted into the fuel inlet 10, such that the fuel inlet door 12 can open/close.

The operation direction of the locking mechanism 15 is defined as an inward direction to the axis and an outward direction to the opposite outside, with respect to the central axis of disc-shaped fuel inlet door 12 or the circular pipe-shaped fuel inlet 10.

To this end, the locking mechanism 15 is implemented by combining a plurality of, for example, three or four sliders 16, and the sliders 16 are arranged in one concentric circle around the center of the fuel inlet door 12 (for example, they may be arranged in series around the cap at the center of the fuel inlet door), thereby making a circle.

A little gap 23 is defined between the sliders 16, which are arranged as described above, and the gaps 23 provide spaces where the sliders 16 can move inward/outward.

The slider 16 of the locking mechanism 15 is composed of a body vertically standing in an arc shape and a flange 18 horizontally extending from the lower end of the body, which are integrally formed, and the sliders 16 are arranged with the bodies circumferentially disposed in series close to each other, thereby making a circle. One will appreciate that such integral components may be monolithically formed.

The outer circumferential surface of the slider 16, that is, the outer circumferential surface of the body forms an inclined surface having a diameter increasing downward, such that as the inclined surfaces 17 are brought in contact with the front end of a nozzle, the sliders 16 are naturally pushed inward.

Further, since the slider 16 has the flange 18 extending at an angle of 90° from the vertical body, it can be locked/unlocked into/out of the locking grooves 14 on the fuel inlet door 12, using the edge of the flange 18.

For the movement of the sliders 16, guide protrusions 17 are formed on the bottom of the sliders 16 and guide holes 20 are formed on the top of the fuel inlet door 12 such that the guide protrusion 17 can slide into the guide holes 20. Accordingly, the sliders 16 can be moved inward/outward while being guided to slide by the guide protrusions 19 that move along the guide holes 20.

Since the guide protrusions 19 and the guide holes 20 all have a T-shaped cross-section, the guide protrusions 19 are prevented from separating upward out of the guide holes 20, such that the sliders 16 can stably move without separating.

The sliders 16 are elastically pushed outward by the springs 21 in the guide holes 20, and accordingly, they keep pushed outward by the springs 21 and locked in the locking grooves 4, when an external force is not applied, that is, nozzle is brought in contact with them.

Although the sliders 16 of the locking mechanism 15 perform locking and unlocking while moving together by contact with a nozzle in various embodiments of the present invention, in other embodiments, only one of the sliders 16 may be made slide with the others fixed on the fuel inlet door 12.

For example, in a locking mechanism composed of three sliders, all of the three sliders may be made slide or only one of the sliders may be made slide with the other two sliders fixed.

Further, in various embodiments, it is possible to simplifying the structure by dividing a locking mechanism into two sliders, removing the structure that allows sliding so that one of the sliders can only induce alignment of a nozzle and the locking mechanism, and allowing the other to slide.

Figure 3:
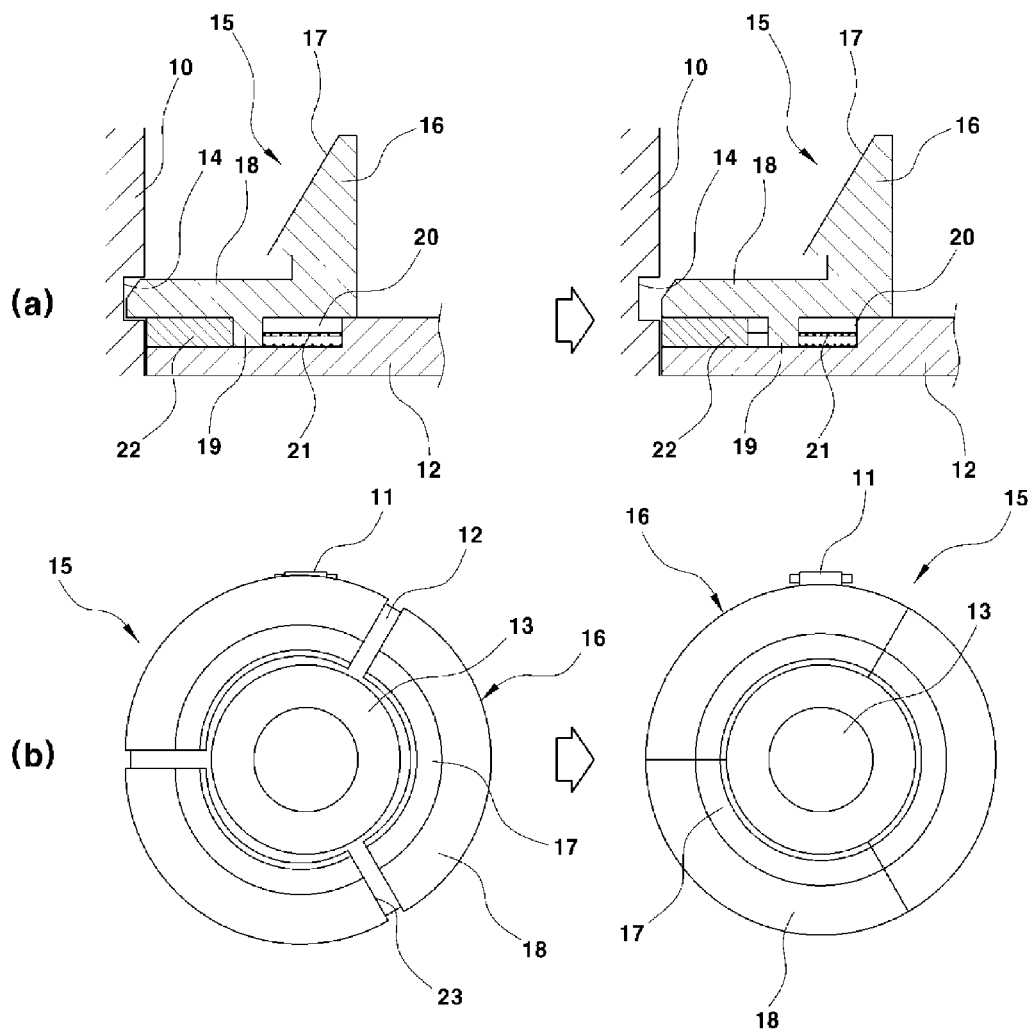
FIG. 3 is a cross-sectional view and a plan view showing the operation of a locking mechanism in an exemplary device for preventing fuel mixing according to the present invention.

FIG. 3 is a cross-sectional view and a plan view showing the operation of a lock in the device for preventing fuel mixing according to various embodiments of the present invention.

FIG. 3 shows locking and unlocking of the locking mechanism 15 when an external force is applied (a nozzle is in contact) and when an external force is not applied (a nozzle is not in contact).

When an external force is not applied, as shown in (a) of FIG. 3, the sliders 16 of the locking mechanism 15 keep pushed outward by the force of the springs 21, with the flanges 18 of the sliders 16 locked in the locking grooves 14 of the fuel inlet 10, such that the fuel inlet door 12 can keep closed.

When an external force is applied, as shown in (b) of FIG. 3, that is, when the inclined surfaces 17 of the sliders 16 of the locking mechanism 15 are pressed by the end of a nozzle, the sliders 16 are pushed inward against the force of the springs 21, that is, the sliders 16 move to the center and the flanges 18 of the sliders 18 move out of the locking grooves 14 of the fuel inlet 10, such that the fuel inlet door 12 can open while pivoting about the door hinge 11.

Figure 4A:
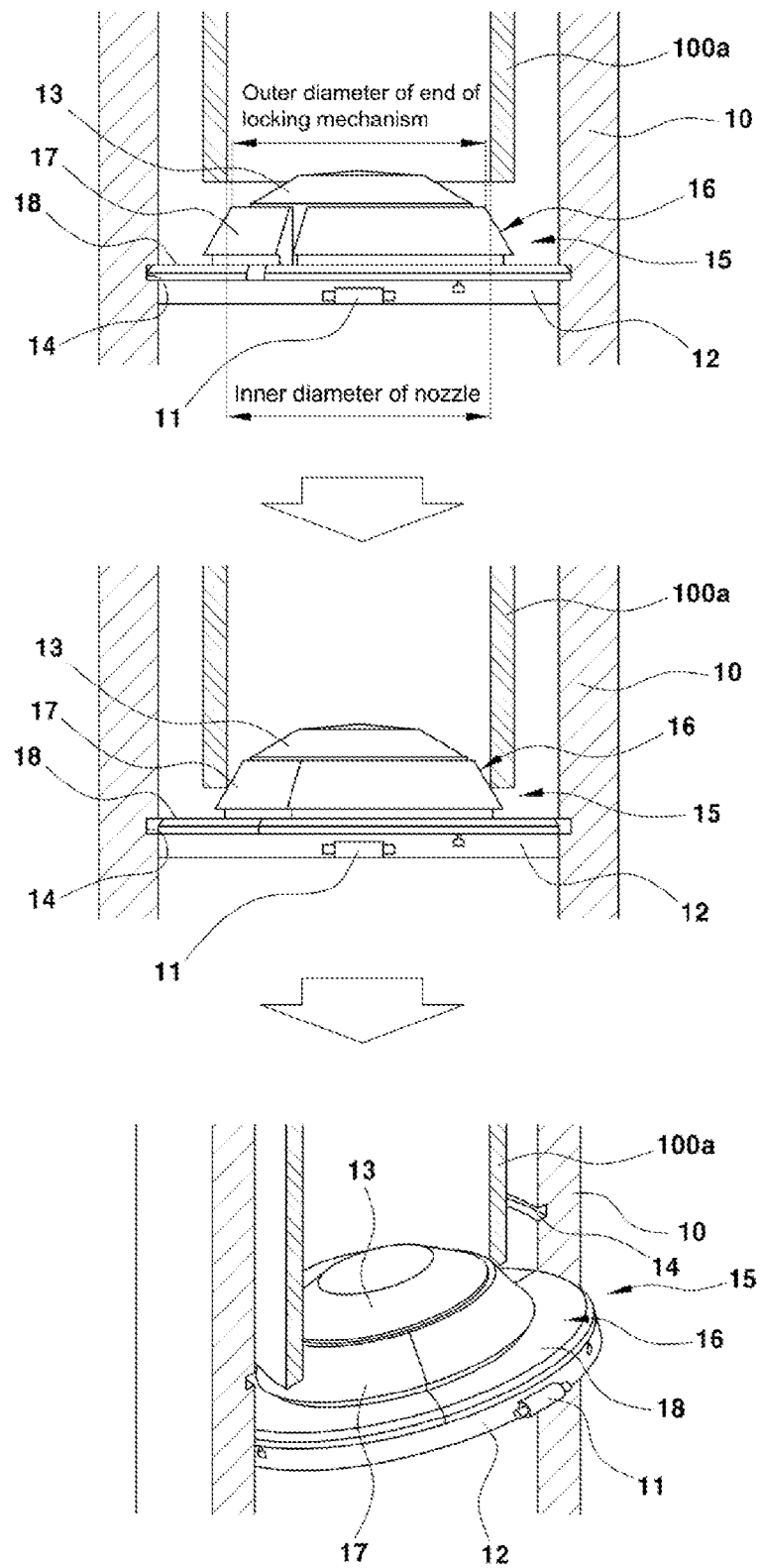
FIG. 4A and FIG. 4B are perspective cross-sectional views showing the use of an exemplary device for preventing fuel mixing according to the present invention.
Figure 4B:
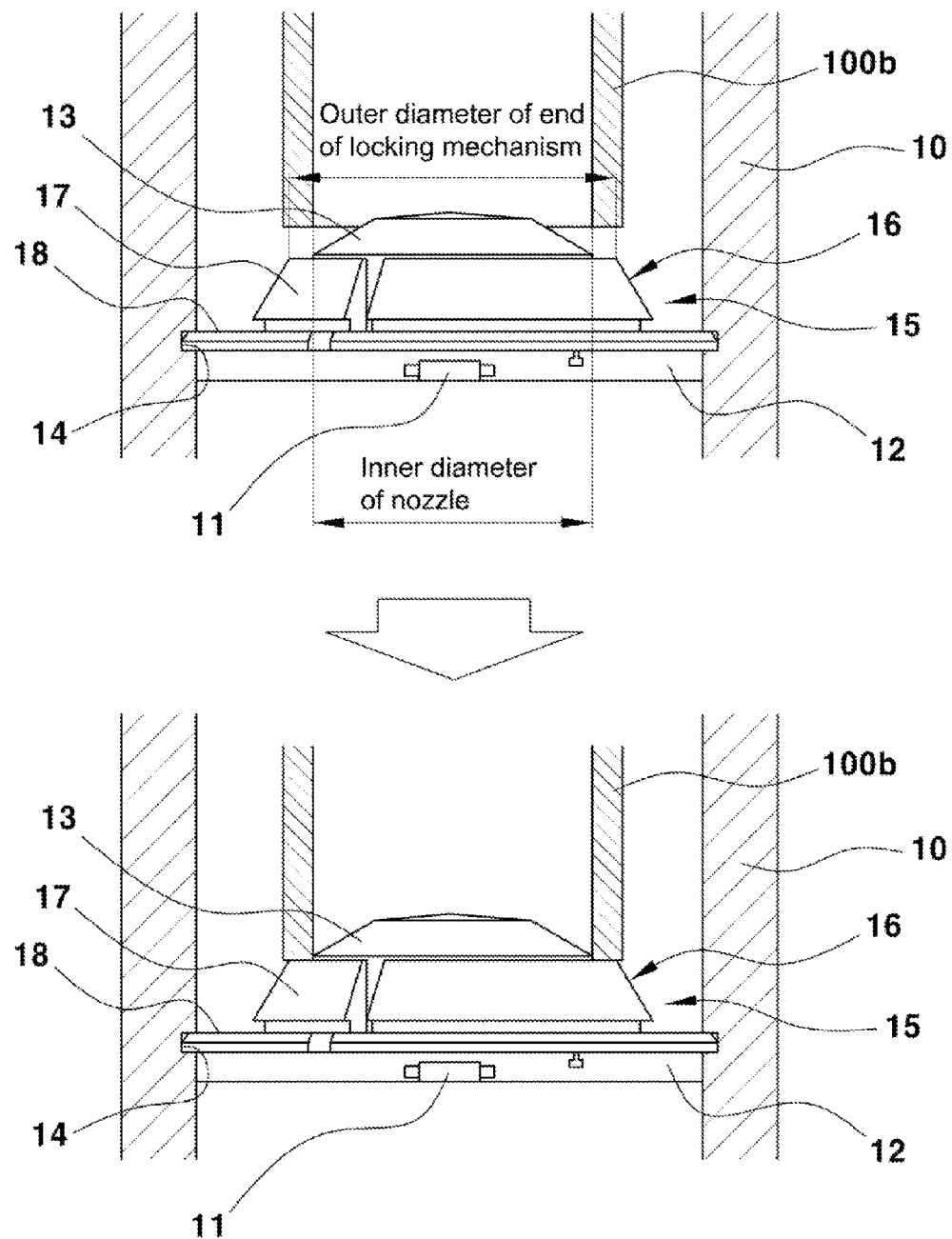

FIGS. 4A and 4B are perspective cross-sectional views showing the use of the device for preventing fuel mixing according to various embodiments of the present invention.

FIG. 4A shows fueling a diesel vehicle with a diesel nozzle 100a.

When the diesel nozzle 100a is inserted into the fuel inlet 10 and the end of the nozzle is pushed down in contact with the sliders 16 of the locking mechanism 15, the sliders 16 are pushed inward and unlocked from the locking grooves 14 of the fuel inlet 10, because the inner diameter of the diesel nozzle 100a is larger than the outer diameter of the end of the locking mechanism 15, that is, the outer diameter made by the upper ends of the inclined surfaces of the sliders 16 gathered in a circle.

Accordingly, the locking mechanism 15 is turned off and the fuel inlet door 12 pivots about the door hinge 11, such that a suitable kind of fuel (diesel) can be pumped into the vehicle.

FIG. 4A shows fueling a diesel vehicle with a gasoline nozzle 100b.

When the gasoline nozzle 100b is inserted into the fuel inlet 10 and the end of the nozzle is pushed down in contact with the sliders 16 of the locking mechanism 15, the end of the gasoline nozzle 100b is locked to the upper ends of the sliders 16 without being pushed any more and the sliders 16 also keep locked in the locking grooves 14 of the fuel inlet 10, because the inner diameter of the gasoline nozzle 100b is smaller than the outer diameter of the end of the locking mechanism 15, that is, the outer diameter made by the upper ends of the inclined surfaces 17 of the sliders 16 gathered in a circle.

Accordingly, the locking mechanism 15 keeps turned on and the fuel inlet door 12 does not open, such that an unsuitable kind of fuel (gasoline) cannot be pumped into the vehicle.

Further, the cap 13 on the fuel inlet door 12, for example, the cap 13 having an outer diameter fitting to the inner diameter of the gasoline nozzle 100b closes the gasoline nozzle 100b, such that it is possible to prevent the fuel from overflowing, even if a person who fuels the vehicle inserts a nozzle for fuel unsuitable for the vehicle and then starts fueling by mistake.

Although only the fuel inlet of a diesel vehicle was described above, it is also possible to implement a fuel inlet without a fuel cap by applying the present invention to the fuel inlet of a gasoline vehicle in various embodiments.

For example, it is possible to apply the way of unlocking the locking mechanism when inserting a gasoline nozzle, by making the diameter made by the upper ends of the sliders of the locking mechanism different, that is, by making the diameter made by the upper ends of inclined surfaces of the sliders smaller than the inner diameter of the gasoline nozzle and making the diameter made by the lower ends of the inclined surfaces of the sliders larger than the inner diameter of the gasoline nozzle.

As described above, since the present invention provides a new type of device for preventing fuel mixing which allows fueling when a nozzle for a suitable kind of fuel is inserted and prevents fueling when a nozzle for an unsuitable kind of fuel is inserted, by providing a locking mechanism that is turned on/off in accordance with the inner diameter of a nozzle at the fuel inlet door of a vehicle, it is possible to basically solve the problem of fuel mixing due to poor operation of a nozzle by a person who fuels the vehicle, and accordingly, it is possible to preclude an accident due to fuel mixing.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for preventing fuel mixing in a vehicle, comprising:
    a fuel inlet for injecting fuel;
    a fuel inlet door that is pivotable by a door hinge in a door inlet, as a member opening/closing the fuel inlet; and
    a locking mechanism that is slidably disposed on a top of the fuel inlet door and opens/closes the fuel inlet door while moving radially inward/outward by contact with a nozzle to be locked/unlocked into/out of locking grooves formed in an inner surface of the fuel inlet,
    wherein the locking mechanism includes a plurality of sliders arranged in a concentric circle around the fuel inlet door, and
    wherein each of the sliders includes an inclined surface configured for selectively contacting with the nozzle around an outer side of the inclined surface, and each of the sliders is selectively locked into the locking grooves via an edge of a flange positioned at a lower end of the sliders.

2. The device of claim 1, wherein the each of the sliders of the locking mechanism is fitted in a guide hole on the top of the fuel inlet door, using a guide protrusion on its bottom, to be guided.

3. The device of claim 2, wherein a spring that elastically biases outward the guide protrusion of the sliders is disposed in the guide hole of the fuel inlet door.

4. The device of claim 1, wherein at least one of the sliders of the locking mechanism is slidable.

5. The device of claim 1, wherein a cap that prevents fuel from overflowing is disposed on the top of the fuel inlet door.

* * * * *